Figure 1:
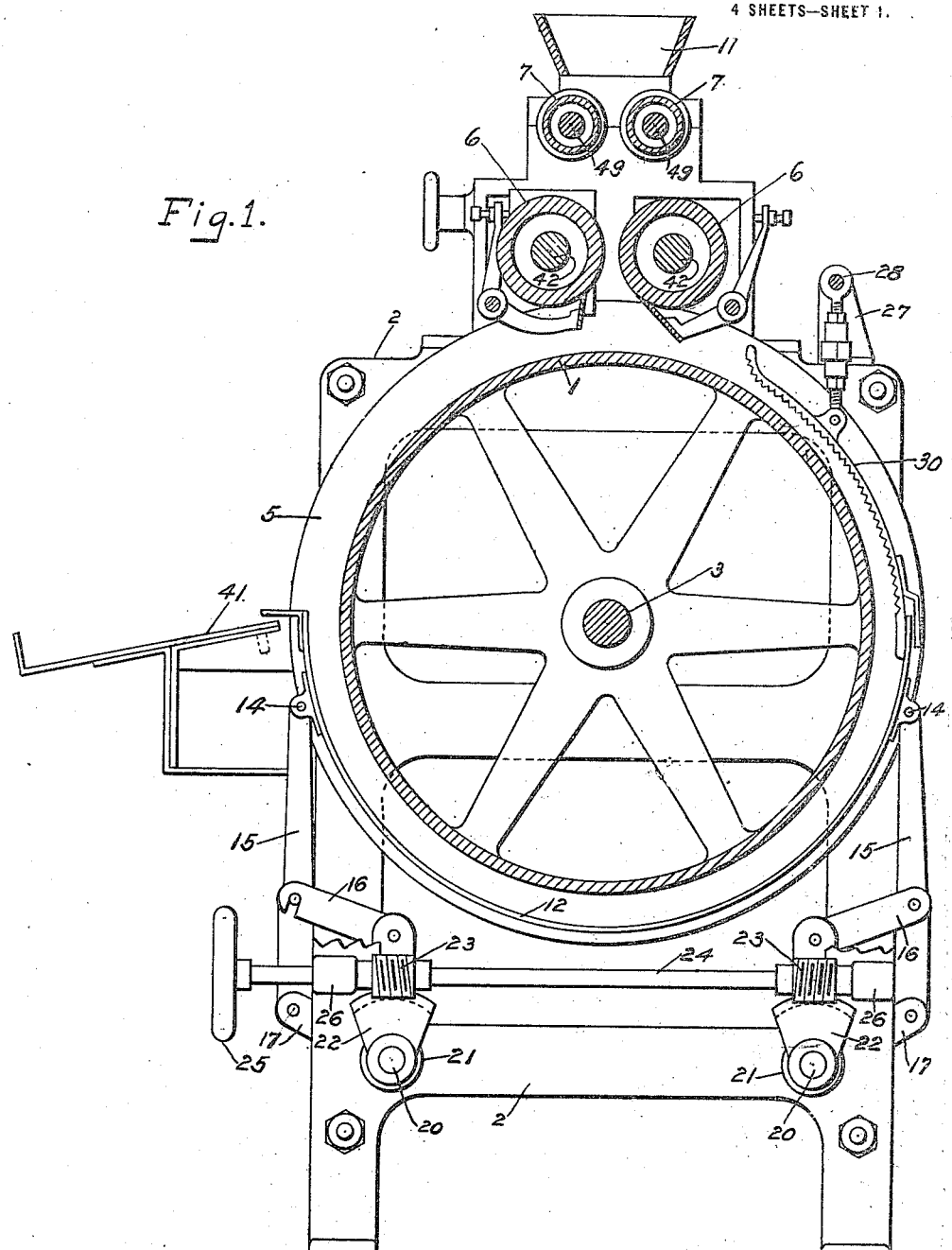

D. K. ALLISON.
DOUGH MOLDING MACHINE.
APPLICATION FILED AUG. 3, 1912.

1,163,626.

Patented Dec. 7, 1915.
4 SHEETS—SHEET 1.

Witnesses
C. R. L. Crunk
Wm. Huet.

Inventor
Daniel K. Allison

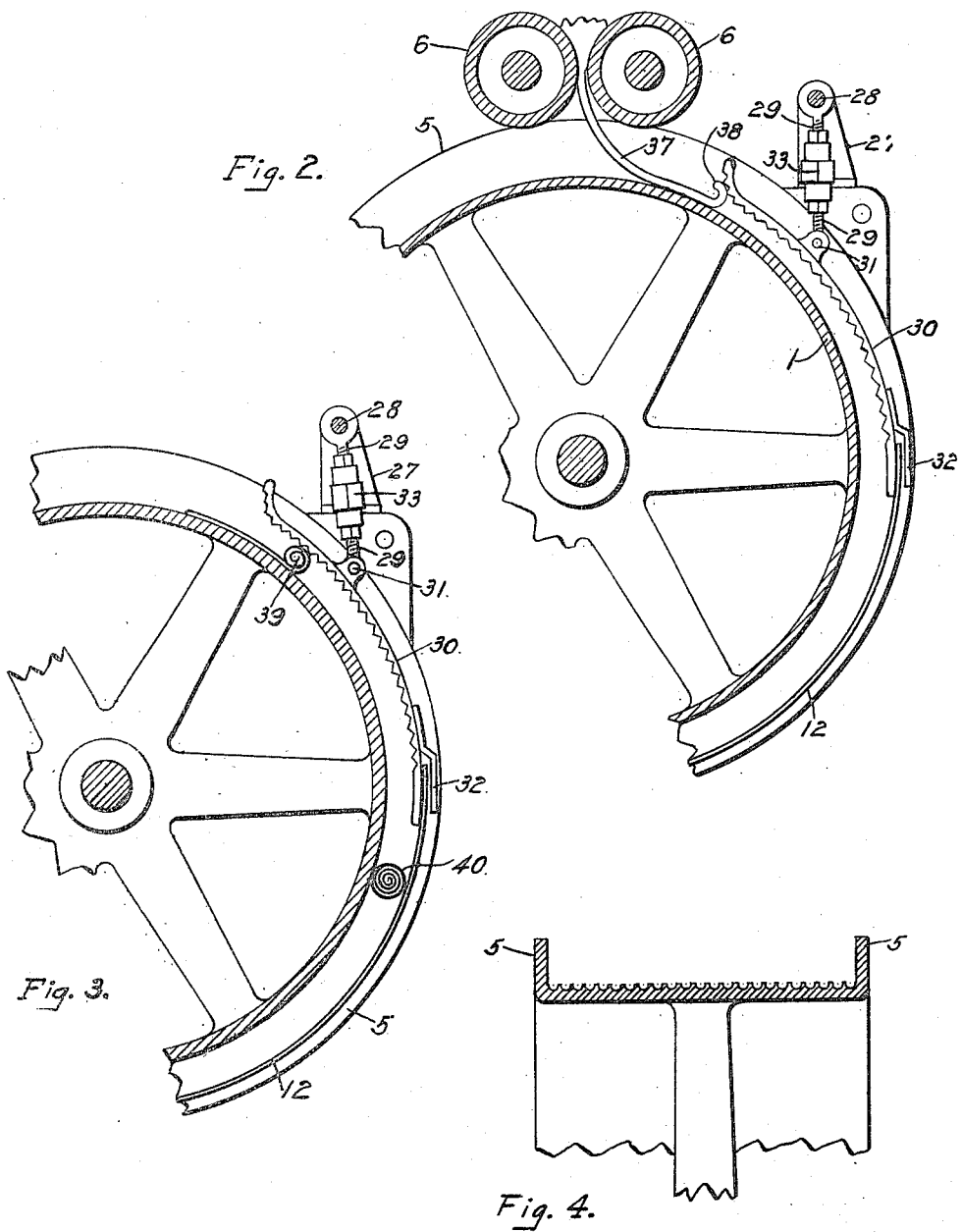

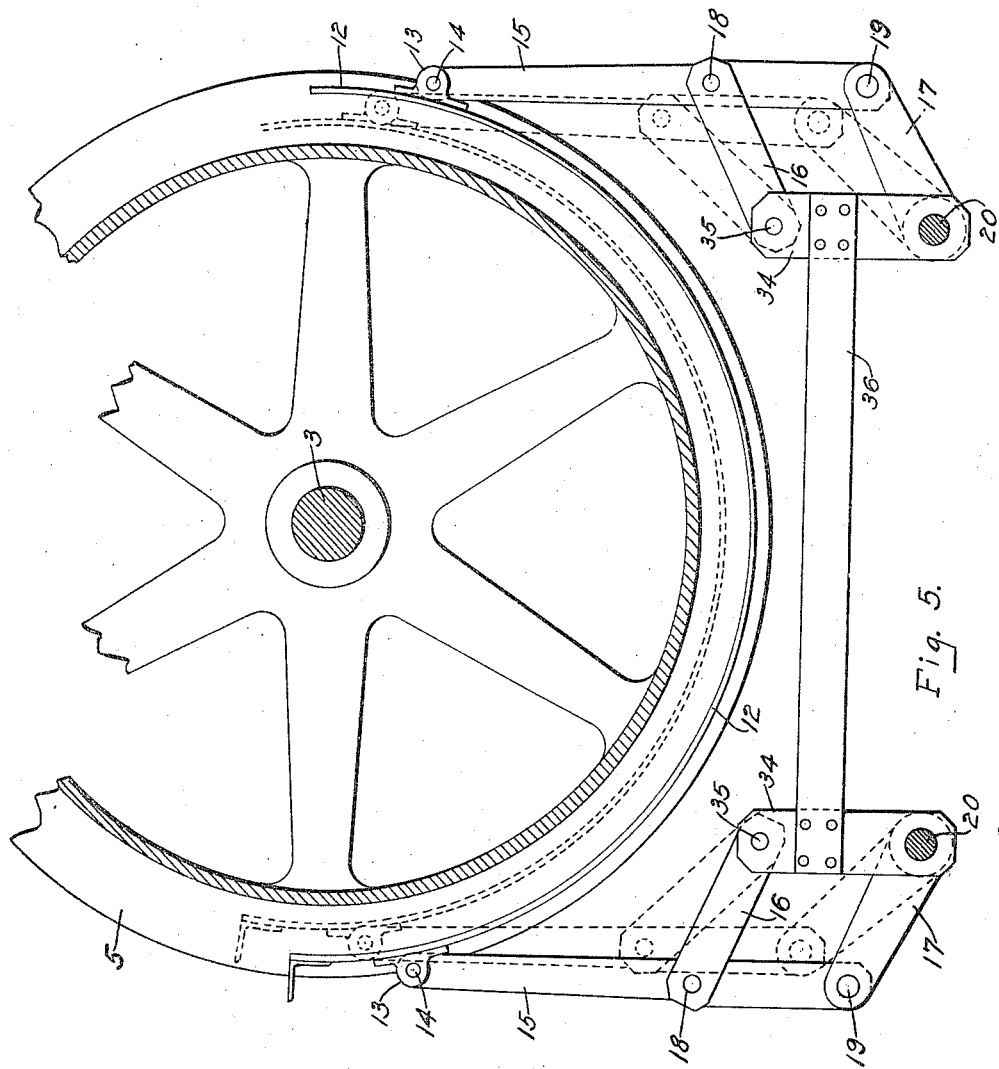

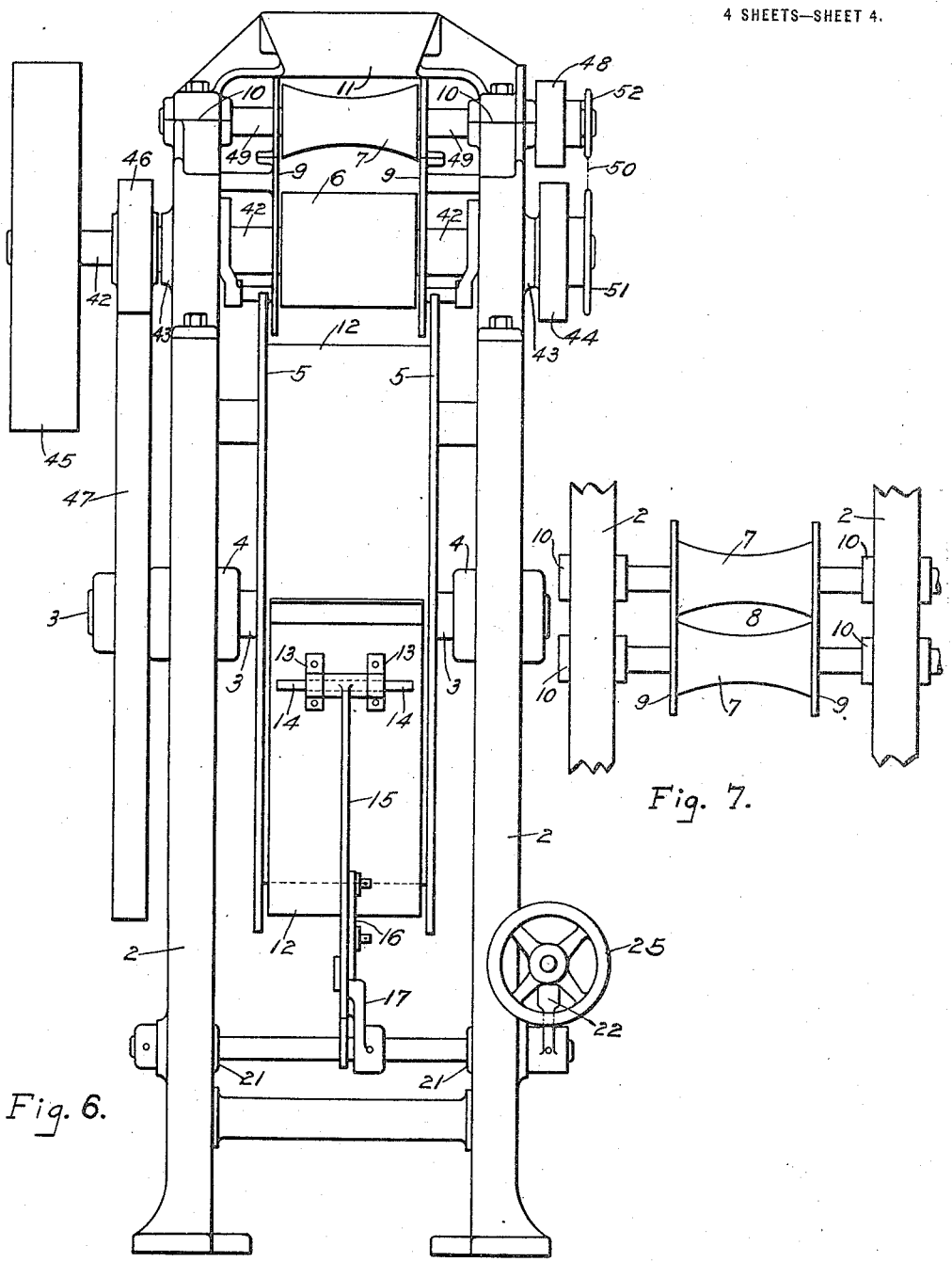

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

DOUGH-MOLDING MACHINE.

1,163,626. Specification of Letters Patent. Patented Dec. 7, 1915.

Application filed August 3, 1912. Serial No. 713,024.

*To all whom it may concern:*

Be it known that I, DANIEL K. ALLISON, a citizen of the United States, residing at Cincinnati, in the county of Hamilton and State of Ohio, have invented certain new and useful Improvements in Dough-Molding Machines, of which the following is a specification.

My invention relates to machines for molding and shaping dough and its object is to provide a machine into which an irregular mass of dough may be dropped and the same may be rolled, kneaded and shaped suitable for a loaf of bread without the use of manual labor.

The novel features of my invention will be herein fully described and set forth in the claims.

In the accompanying drawings Figure (1) is a vertical section of the entire machine; Fig. (2) is a section through the drum (1) and gage rolls 6—6; Fig. (3) is a similar view of the drum (1) illustrating the coiling process; Fig. (4) is an enlarged partial section of the drum (1); Fig. (5) is an enlarged vertical section through the drum (1), showing the pressure plate 12 and its supporting mechanism; Fig. (6) is a front elevation of the entire machine with the table 41 removed; Fig. (7) is a plan view of the feed rolls 7—7 mounted in the frames 2—2.

The drum (1) is mounted between the side frames 2—2 fixed to the transverse shaft (3) which is journaled in suitable bearings 4—4 integral with said side frames. Said drum is provided with flanges 5—5. The periphery of said drum is grooved as shown in Fig. (4). The gage rolls 6—6 are journaled in any suitable bearings in the side frames 2—2, above said drum. Said rolls 6—6 are fixed upon shafts 42—42. Said shafts are suitably journaled in bearings 43—43, located in side frames 2—2 and are provided at one end with suitable intermeshing gears 44—44. One of said shafts 42 is extended on one side of the machine and is provided with drive pulley 45. The pinion 46 is also fixed to said shaft and drives gear 47 which is fixed to the drum shaft (3). The feed rolls 7—7 are fixed to shafts 49—49 which are journaled in bearings 10—10, located in the side frames above said gage rolls. These feed rolls are also provided with intermeshing gears 48—48 also fixed to said shafts. These feed rolls are driven by a chain (50) connecting the drive sprocket wheel (51) fixed to shaft (42) and the driven sprocket wheel (52) fixed to shaft (49). The surfaces of these feed rolls are curved so that the opening between them shall be wider in the middle than at their ends as shown in Fig. (7). This opening I will designate by (8). 9—9 designates stationary end plates for said feed rolls which may be supported and secured to said side frames in any suitable manner. Above said feed rolls is the feed hopper (11). The pressure plate 12 is curved to conform to the shape of the drum (1). and spaced therefrom a certain distance to form a passage way through which the loaves travel. At or near the ends of the pressure plate (12) the lugs 13—13 are secured. Through these lugs, the pins 14—14 are inserted, forming pivotal connection with the bars 15—15. These bars 15—15 are pivotally connected to the parallel arms 16—16 and 17—17 by the pins 18—18 and 19—19. The arms 17—17 are rigidly mounted on the transverse shafts 20—20. The arms 16—16 are pivoted to the upright bars 34—34 at 35—35. The lower ends of said upright bars are freely mounted upon shafts 20—20. Said bars are retained in their upright position by the horizontal tie bar 36 being secured thereto. The upright bars 15—15, while being sufficiently rigid to support the pressure plate 12, they should preferably be made of spring steel, and their upper ends should be capable of yielding when excessive pressure is being exerted upon the said pressure plate by the dough mass. Shafts 20—20 are rotatably mounted in bearings 21—21 located in said side frames, having rigidly mounted thereon the gear sectors 22—22. These gear sectors mesh in right and left hand worms 23—23 secured to shaft 24. The hand wheel 25 is also rigidly secured to said shaft 24. Shaft 24 is rotatably mounted in bearings 26—26. The brackets 27—27 are rigidly secured to the side frames 1—1, and support the rod 28. The links 29—29 are suspended from said rod 28 and support the coiling plate 30 being pivotally connected thereto at 31. Said links are provided with right and left hand screws and right and left nuts 33—33, by which said links are lengthened or shortened as may be desired. The coiling plate is curved to conform to the surface of said drum (12) and is corrugated or roughened upon its concaved surface. This roughened or corrugated surface causes friction upon the dough mass and prevents the same from slipping in the process of coiling. The grooves in the surface of the drum as shown in Fig. (4) also prevent the dough sheet from slipping on the drum's surface during said process of coiling. Attached to the lower end of the coiling plate is the guide finger 32 which laps over the end of the pressure plate and holds the lower end of the coiling plate.

In operating the machine the dough mass is dropped into the feed hopper 11; is thence drawn between the feed rolls 7—7 which serve to flatten and draw it out and prepare it for the gage rolls 6—6, where it is rolled into a sheet form. The dough sheet thence drops to the drum and is carried thereby toward the coiling plate 30. In Fig. (2) this process is illustrated, showing the dough sheet designated by 37. When the forward end of said dough sheet contacts said coiling plate said dough sheet begins to roll up into a spiral form. 38 represents the first stage of the rolling up or coiling process and further progress of the dough sheet will cause it to assume the shape illustrated in Fig. (3) by the numeral 39. Further progress still will cause the dough sheet to be completely coiled as indicated by 40 in the same figure. The dough mass will continue to roll in the passage way between the drum and pressure plate where the pressure exerted upon it will cause it to be kneaded and molded into shape suitable for the bake pan when it is discharged onto the table 41. During the process of rolling up the coiling plate will swing upon its suspending links 29 away from said drum sufficiently to allow the dough sheet to coil up; at the same time it will exert a pressure by its weight upon the coil sufficiently to insure continued coiling until the process is completed. When small loaves are to be molded the pressure plate should be brought closely to the periphery of the drum and when large loaves are to be molded it should be withdrawn therefrom to form a larger passage way. This is accomplished by turning the hand wheel 25 in one direction or the other. It will be noticed by reference to Fig. (5) that the bars 15—15 are pivotally connected to parallel arms 16 and 17; that turning the hand wheel 25 will rotate the gear sectors 22—22 in opposite directions, since they mesh in right and left hand worms 23—23. This, in turn, will rotate shafts 20—20 in opposite directions of equal angularity. The arms 17—17 will therefore rotate about the axis of shafts 20—20 as shown by full and dotted lines in Fig. (5), and the bars 15—15 will rise and fall, retaining at all times their upright positions as shown by full and dotted lines in the same figure. One position of the pressure plate is shown by full lines in Fig. (5) and another by dotted lines and it is possible for it to occupy any position between the two illustrated. In the adjustment of the pressure plate the pins 14—14 will move upwardly and inwardly toward the center of the drum, the arc of movement being suitable to insure a uniform spacing at all points between the drum and the pressure plate for any adjustment. It will be noticed that the curvatures of said pressure plate is controlled by the said parallel bars 15—15; that it may be opened or closed to form a larger or smaller passage way with the drum; that as the ends of the pressure plate are forced in toward the center of the drum the bottom part is raised a corresponding amount to insure a uniformity of the said passage way. This action of the pressure plate is caused by the angular travel of the parallel bars 15—15.

Having fully described my invention what I claim and desire to secure by Letters Patent are:—

1. In a dough molding machine, a revolving drum, a coiling plate curved to conform to the surface of said drum and spaced therefrom to form a passage way in which a sheet of dough may be rolled into a spiral roll, said coiling plate being suspended by swinging links attached to the upper end thereof, and arranged so that impact from the sheet of dough will cause the upper end of said coiling plate to swing away from said drum and thereby cause said dough sheet to be bent or folded over and begin to roll up into a spiral roll.

2. In a dough molding machine the combination with gaging rolls, a revolving drum and curved pressure plate of a coiling plate curved to conform to the surface of said drum and suspended freely upon links a predetermined distance from said drum and having its dough engaging surface roughened and its lower end held by said pressure plate.

3. In a dough molding machine, a revolving drum, a curved coiling plate suspended above said drum and forming therewith a passage way in which a sheet of dough may be rolled into a spiral roll, swinging links attached to the upper end of said coiling plate arranged to resist impact from the dough sheet and thereby cause its forward end to be bent or folded over and begin to roll up, the lower part of said coiling plate being arranged to yield as the dough roll increases in size to prevent excessive pressure upon the dough.

4. A curved pressure plate supported at or near its ends by parallel bars, parallel links supporting said bars, and means for actuating said links to change the curvature of said pressure plate.

DANIEL K. ALLISON.

Witnesses:
  SAM'L WHITE,
  NATHAN C. W. CHAPMAN.